United States Patent
Takehara et al.

(10) Patent No.: US 7,762,760 B2
(45) Date of Patent: *Jul. 27, 2010

(54) METHOD OF OPERATING A CARGO CONTAINER SCANNING CRANE

(75) Inventors: Toru Takehara, San Mateo, CA (US); Kinya Ichimura, Foster City, CA (US); Philip Alexander Tam, Emeryville, CA (US)

(73) Assignee: Paceco Corp., Hayward, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/877,920

(22) Filed: Jun. 24, 2004

(65) Prior Publication Data

US 2006/0018735 A1  Jan. 26, 2006

(51) Int. Cl.
*B63B 27/00* (2006.01)
*B63B 35/00* (2006.01)
*B66C 19/00* (2006.01)
*G01N 23/04* (2006.01)

(52) U.S. Cl. .............. 414/803; 414/812; 414/140.3; 414/141.3; 378/57; 212/344; 212/325

(58) Field of Classification Search ... 414/140.3–140.4, 414/141.3–141.4, 277, 279; 212/324–6, 212/343–4, 307, 312, 325, 326, 344, 343; 212/324; 378/57

See application file for complete search history.

(56) References Cited

U.S. PATENT DOCUMENTS

| 1,643,489 | A | * | 9/1927 | Fitch ........................... 414/281 |
| 3,687,309 | A | * | 8/1972 | Macrander ............... 414/137.7 |
| 4,722,096 | A | * | 1/1988 | Dietrich et al. ............... 378/57 |
| 5,039,275 | A | * | 8/1991 | Ide .............................. 414/803 |
| 5,638,420 | A | * | 6/1997 | Armistead ..................... 378/57 |
| 5,754,617 | A | * | 5/1998 | Itoh ............................... 378/4 |
| 5,838,759 | A | * | 11/1998 | Armistead ................... 378/57 |
| 5,951,226 | A | * | 9/1999 | Fantuzzi .................. 414/141.3 |
| 6,301,326 | B2 | * | 10/2001 | Bjorkholm .................... 378/57 |
| 6,652,211 | B2 | * | 11/2003 | Takehara et al. ......... 414/140.3 |
| 6,698,990 | B1 | * | 3/2004 | Dobner et al. ........... 414/139.9 |
| 6,778,631 | B2 | * | 8/2004 | Franke ....................... 378/57 |
| 6,845,873 | B1 | * | 1/2005 | Chattey ...................... 212/270 |

FOREIGN PATENT DOCUMENTS

| JP | 10310368 A | * | 11/1998 |
| JP | 11011870 A | * | 1/1999 |
| WO | WO 2004022474 A1 | * | 3/2004 |
| WO | WO 2004085298 A1 | * | 10/2004 |

* cited by examiner

*Primary Examiner*—Gregory W Adams
(74) *Attorney, Agent, or Firm*—Brian Beverly; Beeson Skinner Beverly (57) ABSTRACT

A mobile cargo container handling buffer crane having a bridge crane mounted thereon for transferring cargo containers between a ship and land transportation with nonintrusive inspection apparatus located at an intermediate transfer position past which a container can be longitudinally translated on a shuttle and thereby non-intrusively inspected.

1 Claim, 4 Drawing Sheets

METHOD OF OPERATING A CARGO CONTAINER SCANNING CRANE

CROSS REFERENCES TO RELATED APPLICATIONS

The present invention is related to assignees' U.S. patent application Ser. No. 10/639,957, filed Aug. 12, 2003, for A Mobile Cargo Container Scanning Crane. It is also related to assignees' U.S. Pat. No. 6,604,904 B2, issued Aug. 12, 2003, for Method for Buffer Crane Operation in Cargo Container Handling. The present invention is further related to the assignees' U.S. Pat. No. 6,602,036 B2, issued Aug. 5, 2003, for Buffer Bridge Crane for Cargo Container Handling Operations. These patent disclosures are incorporated herein by reference.

BACKGROUND OF THE INVENTION

1. Field of the Invention

The present invention relates to an apparatus which effects nonintrusive scanning of cargo containers for detection of nuclear based weapons or fissionable material during container transfer between a ship and land transportation.

More particularly, the present invention relates to a buffer crane having nuclear weapon detection scanning apparatus arranged for non-intrusive interrogation or inspection of cargo containers while each container is being transferred between a ship and quay side land transportation without slowing the quay crane container transfer cycle.

Still more particularly, the present invention is a mobile cargo container buffer and scanning crane which transfers cargo containers between land transportation and a quay crane buffer position during loading or off loading and which moves the cargo container being transferred past a predetermined inspection position for radiation emission or neutron analysis examination by a craneboard apparatus before depositing the cargo container at the intended transfer buffer deposition position.

Specifically, the present invention is a buffer crane in the form of a mobile structure having a shuttle and bridge crane mounted thereon for transferring cargo containers between a quay crane pickup or deposition position and quay side land transportation. It has a predetermined inspection position on the platform where a container can be non-intrusively inspected by longitudinally transferring the container on the shuttle past a radiation emission detection or neutron analysis apparatus located at the inspection position while functioning as a buffer operation. The containers are either deposited on land transportation such as a truck trailer chassis or are picked up by the bridge crane for transfer to the quay crane for further transfer to a ship.

2. Description of the Prior Art

In view of recent terrorist activities throughout the world, considerable effort is being given by analysts to improving security measures with respect to the maritime industry and United States port operations. At the present time, based on the Automated Tracking System, an intelligence based search system used by U.S. Customs, it has been estimated that the probability that contraband will be discovered in containers that are entering the U.S. is less than 50 percent. Thus, the maritime industry provides a delivery system for weapons of mass destruction and every other container could possibly conceal an atomic weapon which, if exploded in a U.S. port, in addition to causing massive destruction, would essentially end international trade.

The methods to be employed to improve U.S. port security may prove severely detrimental to port productivity. The ideal performance standard is 100 percent inspection of inbound containers to U.S. ports. Apart from physically unloading and inspecting the contents of every container, the obvious alternative is to non-intrusively inspect each container such as by x-ray and when more sophisticated means of nonintrusive inspection are developed, such as gamma ray scanning and neutron analysis, implementing the use of those developments in addition to x-ray based systems.

The use of x-ray machinery in one manner or another for the purpose of inspecting containers is discussed in the prior art literature. However, despite the numerous designs, structures, and forms of apparatus disclosed by the prior art, which have been developed for the accomplishment of the specific objectives, purposes, and requirements of container contents inspection, the devices, machines, and methods which have been heretofore suggested to accomplish these goals consist basically of familiar, expected, and obvious, configurations, combinations, and arrangements of apparatus. However, these designs have essentially added processing steps to port operations, and the sizes of the machinery and complexity of the processing steps essentially interrupt the established system of port operations. This factor causes problems when attempting to integrate the technology into dockside cargo container handling.

The problem with instituting high-energy x-ray scanners for cargo container examination, apart from safety concerns, is that the equipment will reduce port productivity by disrupting highly developed port operations and consuming valuable terminal space. The primary disadvantage is the interruption of the cargo container transfer process between ship and shore. Most importantly, it interferes with the quay crane off-loading cycle time which is crucial to a ship's berthing time at the dock which must be kept at a minimum.

The inspection procedure of the related apparatus requires holding a container immobile so that it can be x-rayed. While the cycle times for the x-ray process may ultimately be reduced over time by improved technology, all of the presently considered means for effecting the x-ray process require either stopping the container movement for processing (usually during unloading in U.S. ports and, if required, in loading at foreign ports) or multiple additional handling steps of the container during the transfer process by taking it out of the normal handling cycle, and to an extra handling step, at an x-ray position for processing, and then returning the container into the transfer cycle.

The present invention permits integration of the x-ray process or any other inspection process into the buffer station method of crane operation disclosed in the prior patented related apparatus and methods of buffer crane operation whereby the inspection process can occur concurrently during the cargo container transfer between ship and shore without interruption of the quay crane transfer cycle.

The mobile cargo container scanning crane contemplated according to the present invention departs substantially from the conventional concepts and designs contemplated by the technical literature, and in doing so, provides an apparatus primarily developed for the purpose of nonintrusive cargo container inspection during transfer between ship and shore as described above, but it accomplishes the result in a different and improved manner for producing a transfer cycle with a buffer inclusive procedure for container inspection which is easily integrated into the container transfer cycle for faster processing times and more efficient port operation.

SUMMARY OF THE INVENTION

In view of the foregoing known and obvious disadvantages inherent in the known types and methods of container inspection presently utilized in port operations, the present invention provides a new method, apparatus, and architecture of construction for integrated cargo container inspection during ship and shore container transfers wherein the same can be utilized to maintain port efficiency.

The general purpose of the present invention, which will be described hereafter in greater detail, is to provide a new and improved cargo container inspection apparatus which has many of the advantages of the prior art forms of container inspection mentioned and described above and many novel features and advantages that result in a new integrated cargo container inspection and transfer cycle which is not anticipated, rendered obvious, suggested, or even implied by any of the prior art of container inspection, and heretofore known, either alone or in any combination thereof.

The present invention is a mobile cargo container scanning/buffer crane. It is comprised of a wheel mounted platform formed for independent movement in a quay area. The structure supports a shuttle on dual, parallel elevated horizontal tracks extending between a first predetermined container buffer deposition position located at a first end on said structure, where a cargo container can be position for pickup or deposition by a quay crane, and a second predetermined position located at the second and other end of the structure. A bridge crane is mounted above the tracks at the second end of the structure and arranged for engaging and suspending or depositing and releasing a cargo container disposed at the second predetermined position on the platform. The bridge crane is also arranged for elevating and lowering a container between the second predetermined position and a truck trailer chassis disposed below the tracks proximate to the second predetermined position. A container scanning inspection apparatus is mounted on the platform between the first and second predetermined positions and formed to non-intrusively inspect a container transferred by the shuttle between the first and second predetermined positions.

The more important features of the invention have been broadly outlined in the preceding summary of the invention in order that the detailed description thereof which follows may be better understood and in order that the present contribution to an improvement in the art may be better appreciated. There are additional features of the invention that will be described hereinafter and which will form the subject matter of the claims appended hereto.

With respect to the claims hereof, and before describing at least one preferred embodiment of the invention in detail, it is to be understood that the invention is not to be limited in its application to the details of construction and to the arrangements of the components which are set forth in the following description or illustrated in the accompanying drawings. The invention is capable of being created in other embodiments and of being practiced and carried out in various ways. Also, it is to be understood that the phraseology and terminology employed here are for the purpose of description and should not be regarded as limiting.

As such, those skilled in the art in which the invention is based will appreciate that the conception upon which this disclosure is predicated may readily be utilized as a basis for the designing of other forms, structures, apparatus, systems, and methods for carrying out the several purposes of the present invention. It is important, therefore, that the claims be regarded as including such equivalent constructions in so far as they do not depart from the spirit and scope of the present invention.

Further, the purpose of the appended abstract is to enable the United States Patent and Trademark Office, and the public generally, and especially scientists, engineers and practitioners of the art who are not familiar with the patent and legal terms or phraseology, to determine quickly from cursory inspection the nature and essence of the technical disclosure of the application. The abstract is neither intended to define the invention of the specification, which is measured by the claims, nor is it intended to be limiting as to the scope of the invention in any way.

OBJECTS OF THE INVENTION

It is therefore an important object of the present invention to provide a cargo container non-intrusive inspection apparatus for port operations.

It is another object of the present invention to provide a cargo container inspection apparatus which is integrated into a buffer operation of the quay crane cycle for transferring a cargo container between ship and shore without slowing the crane transfer cycle.

It is a further object of the present invention to provide a mobile crane which transfers a cargo container between a buffer station and land transportation with a container inspection procedure integrated into the buffer crane transfer cycle without quay crane container movement interruption.

It is still another object of the present invention to provide a mobile crane which carries fixed position nuclear weapon detection apparatus for inspecting cargo containers suspended by the crane while they are being transferred between a ship and shoreside operations and are transported past the integral scanning apparatus.

And it is yet a further object of the present invention to provide a mobile crane which transfers cargo containers between land transportation and a buffer station for pickup or deposition by a quay crane and which permits nuclear weapon detection inspection of the suspended cargo containers while they are moved by the crane during transfer between the two positions.

Other objects and advantages of the present invention will become apparent when the description of the apparatus of the present invention is considered in conjunction with the accompanying drawings.

DESCRIPTION OF THE PREFERRED EMBODIMENT

Reference is made to the drawings for a description of the preferred embodiment of the present invention wherein like reference numbers represent like elements on corresponding views.

Figure 1:
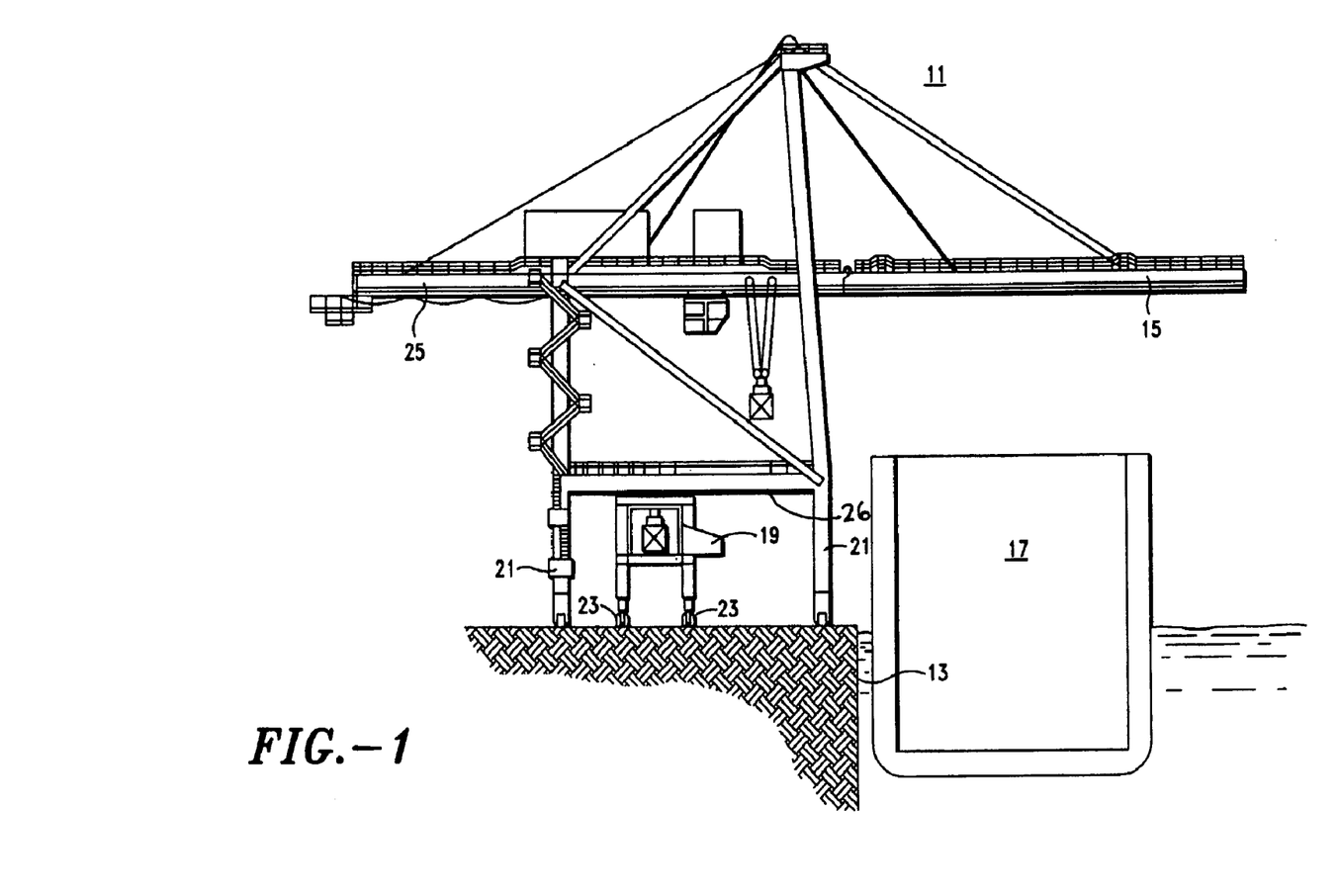
FIG. 1 is a side elevation of a typical quay crane with a scanning crane of the present invention located thereunder.

Reference is made to FIG. 1 of the drawings which shows a typical cargo container handling quay crane 11 located dockside in a shipping port. It is mounted on rails disposed parallel to the dock edge 13. The quay crane traverses the wharf to position itself to project its cantilevered boom 15 over the rows of container cells of the adjacently berthed ship 17 when the boom is lowered. The scanning bridge crane 19 of the present invention is shown disposed below the quay crane between the support legs 21. It is mounted on pneumatic tires 23 for independent movement on the wharf whereby it can be located at variable positions below or adjacent to the quay crane: either between the support legs or alongside under a cantilevered shoreside back reach 25.

The scanning crane 19 is a low-profile buffer crane which can be positioned underneath the crossmembers 26 of a quay crane 11 between its support legs 21 during container handling operations. It is contemplated that a buffer/scanning crane could also be utilized in a railroad stacking yard, under a large bridge or straddle crane, as well as dockside, so the term "quay crane" as used in the claims to describe the environment of the invention is intended to include these and other types of container storage yard and rail yard container handling cranes as well.

Figure 2:
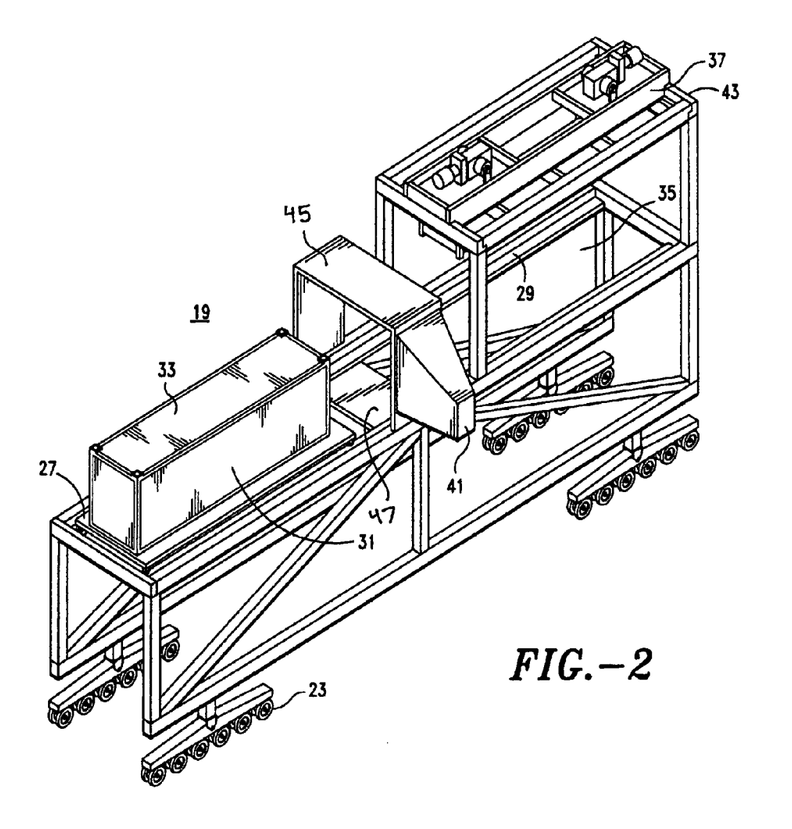
FIG. 2 is a is a perspective view of the scanning crane of the present invention shown in operation.
Figure 3:
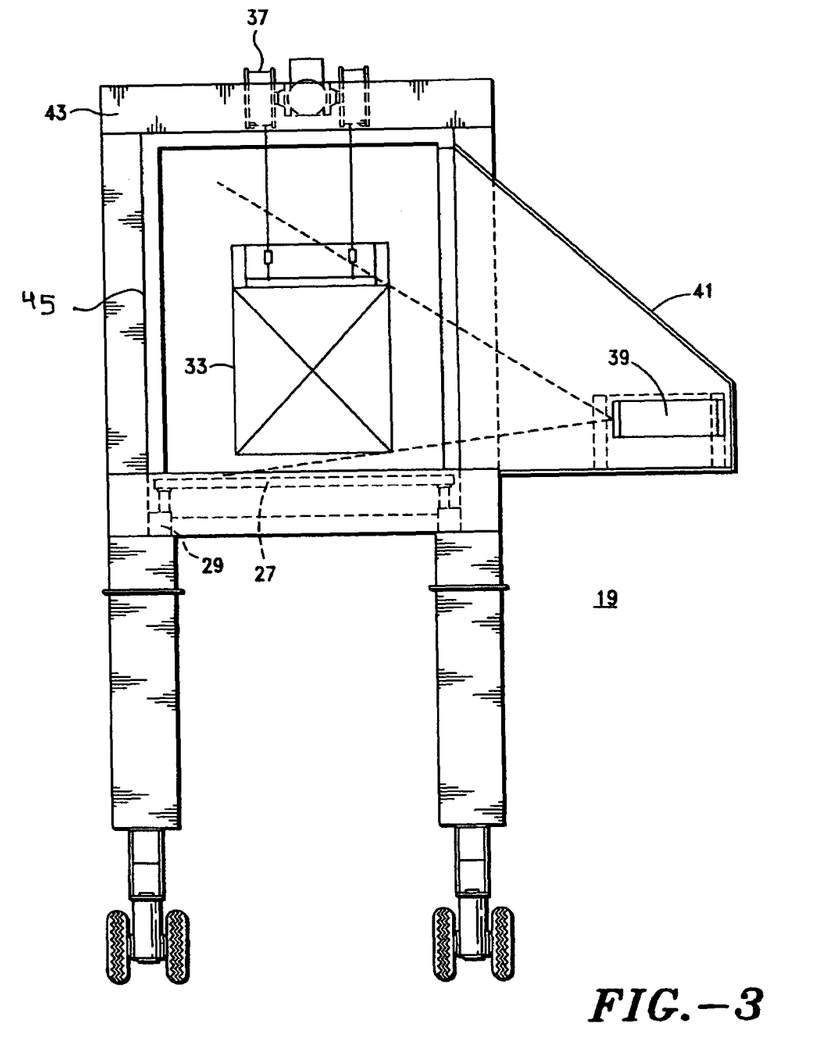
FIG. 3 is a is an end view of FIG. 2.
Figure 4:
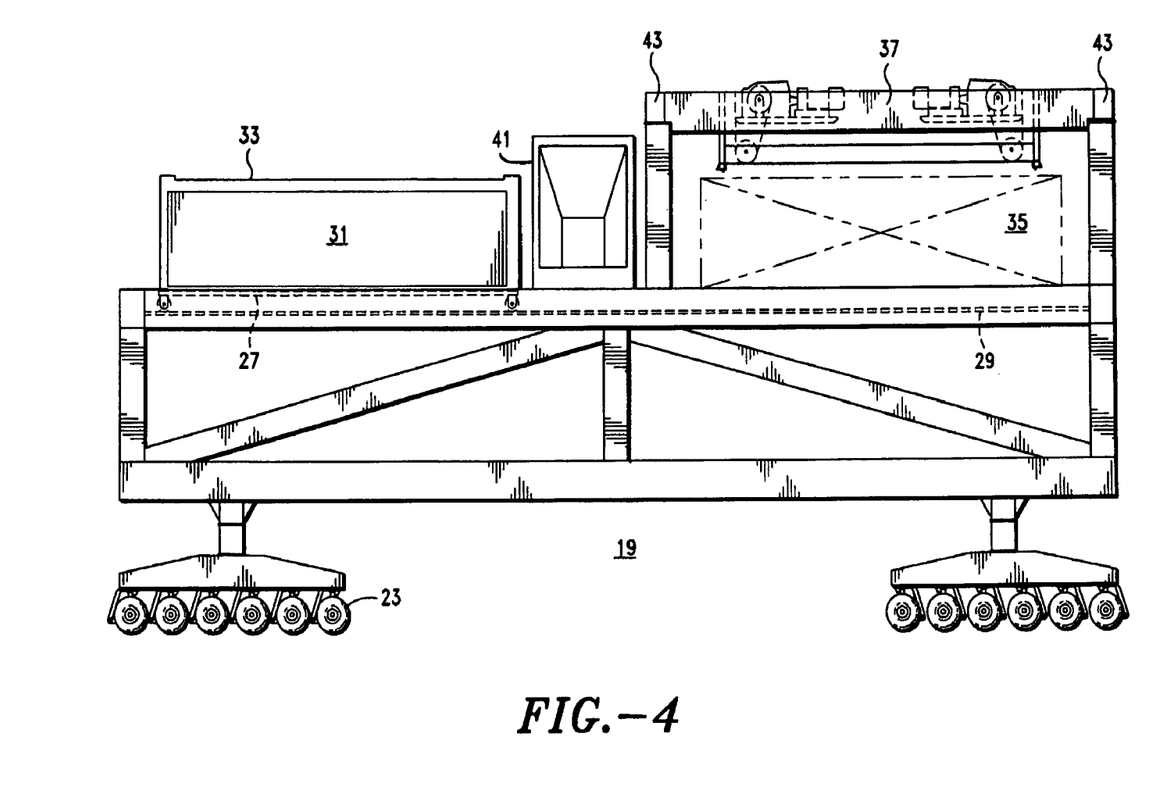
FIG. 4 is a is a side elevation of FIG. 2.

Reference is made to FIGS. 2-4 of the drawings which disclose a preferred embodiment of a relatively low profile mobile cargo container buffer/scanning bridge crane 19 in operation as contemplated by the present invention. The crane is comprised of a multiple tire or wheel supported structure formed for independent movement in a quay area. It is essentially a landing deck for containers mounted on legs so that container transporters can pass underneath. Containers can be landed on the deck by a quay crane 11 and temporarily stored when they are removed from shipboard or where containers picked off ground level transporters can be landed and stored until they are picked up by the quay crane for transport to a ship. This interim storage of containers between transfer operations constitutes a container buffer storage operation.

As will be explained, the preferred embodiment of the invention can handle at least two cargo containers simultaneously. The landing deck can thereby function as a buffer crane quite effectively and even more so when constructed with multiple landing positions for containers as described in the patents described supra and incorporated herein which disclose alternative types of buffer cranes.

The landing deck of the buffer scanning crane is a wheeled shuttle 27 mounted on dual, parallel elevated horizontal tracks 29 supported by the crane structure at a level above the truck trailer chassis loading and off loading area beneath the structure. The shuttle moves containers from one end of the structure to the other.

The crane 19 has a first predetermined buffer container deposition position 31 located at a first end on the structure. It is for the deposit of containers 33 which have been off-loaded from a ship by a quay crane 11 for transfer to land transportation or where containers being transferred from land transportation can be positioned by the shuttle until picked up by the quay crane for transfer to a ship.

This first predetermined position 31 is labeled the "first" for designation purposes and does not necessarily describe its position as a sequence step in container transfer operations except in the one specific mode of crane operation: ship to shore transfer. Conversely, it is the last predetermined position in a shore to ship container transfer. Therefore, the designation as a first position is an arbitrary selection simply because the most immediate need in the industry is for inspection of containers being landed in the United States, and that sequence starts with the quay crane landing the container first on the buffer deposition position of the scanning crane.

The scanning/buffer crane 19 has a second predetermined position 35 located at the other or second end of the structure which, in the preferred embodiment of the invention, can be considered a suspended position where a container is picked up from the shuttle 27 and oriented for lowering onto a truck trailer chassis located below the second predetermined position. It is also where containers are landed on the shuttle after being transferred from the ground transportation. The preferred embodiment of the invention can thus handle at least two containers simultaneously with one disposed on the shuttle at the first end of the crane structure awaiting pickup by the quay crane or transfer to the other or second end of the crane while a second container can be suspended at the second predetermined position waiting transfer to the shuttle or ground transportation. This capacity permits a substantial buffer operation to be effected because the transfer/inspection cycle in the buffer crane is generally shorter than the quay crane cycle time.

In terms of relative time, the scanning crane 19 can usually remain engaged to or hold onto a pair of containers 33 being transferred between ship and shore a sufficient period of time to permit a reasonably long period of time for weapons scanning during the transfer operations in relation to the cycle time of the quay crane 11 in order to accomplish the inspection/interrogation process on a container during a quay crane cycle.

The quay crane 11 requires time to engage a container, either on shipboard in a container cell, or shoreside from a dockside transporter or a buffer crane, and then to lift the container to shipboard clearance height while translating it horizontally between ship and shore, and then for lowering the container to an accurate deposition height and position for release either in a shipboard cell or onto a predetermined deposition position on a buffer crane or onto a ground transporter. This quay crane transfer cycle time involves considerably more time than the scanning crane needs to move a container on the shuttle 27 the short distance past an inspection position, allowing the necessary time for the apparatus to scan it, and to locate it at the predetermined release position. As a result, the scanning crane, when functioning in a buffer operation, can perform the scanning operation without interrupting the quay crane cycle times as it can handle two containers while the quay crane is handling one.

The related patents, supra, disclose buffer cranes which include multiple landing/storage positions to ensure that a fully functional buffer operation is achieved, but even a single buffer container landing position on a scanning crane will be sufficient for performing a buffer operation in those cases where the quay crane transfer cycle times are normal and will permit the scanning process to be included in the buffer crane operation.

A bridge crane 37 is mounted on a pair of leg supported crossbeams 43 above the mobile platform or shuttle 27 at the second end of the structure and is arranged for engaging either a cargo container 33 mounted on a truck trailer chassis, disposed below the second predetermined position, or for depositing a container onto the shuttle thereat. The bridge crane is arranged for elevating and lowering the containers between the land transportation and the second predetermined position.

In those situations where the clearance height under the crossmembers extending between the legs of a quay crane is limited, it may not be possible to drive container transporters under the scanning crane 19. In that case, it would be necessary to lift or deposit containers from and to transporters parked alongside the scanning crane. To do so, the support rails for the bridge crane 37 on the crossbeams 43 would have to be extended to project laterally over the adjacent truck parking positions with cantilevered beam projections, and the bridge crane would be provided with wheels and track to move laterally outboard from the second predetermined position to lift and lower containers alongside crane structure area. As a result, an additional predetermined truck trailer chassis parking position would be created alongside the buffer crane rather than underneath it but that position is still included in the description of being below the second predetermined position. This structure is disclosed in related U.S. Pat. No. 6,602,036 B2, supra.

The bridge crane 37 is formed for raising a container from a trailer chassis located beneath the second predetermined position to above the shuttle height at the second predetermined position. for depositing containers on the shuttle 27. During ship loading, the shuttle moves the containers through the scanning apparatus, and then the quay crane picks the container off the shuttle for transfer to a ship. During ship unloading, the quay crane places the container on the shuttle for transition through the scanning apparatus. The bridge crane then picks the container off the shuttle and lowers it to the land transportation truck trailer chassis.

In other words, the bridge crane moves containers between land transportation and the quay crane landing position on the shuttle with an intermediate container scan position on the shuttle for container examination during that portion of the transfer cycle between the land transportation and the quay crane or the reverse. The second predetermined position in the preferred embodiment of the invention is either a suspended position, or landed on the trolley when it is located at the second predetermined position.

A container scanning inspection or interrogation apparatus 39 is mounted on the crane structure approximately in the middle thereof to scan the length of a cargo container 33 supported by the shuttle 27 when it is translated between the first and second predetermined positions 31, 35.

Reference is made to FIGS. 2 and 3 of the drawings. The scanning inspection apparatus 39 envisioned by the present invention includes a focused radiation emitter, radiation detector, or neutron activator housed in a shield 41 which directs or focuses the scanning apparatus output or receptors toward the container 33 when it is reciprocated between the first and second predetermined positions 31, 35 by the shuttle 27. A receptive screen and radiation shield 45 can be positioned as part of the shield 41 behind or on the opposite side of the container from the radiation source of the container scanning inspection apparatus and supported by the crane structure which supports the scanning apparatus and its shielding. The shielding 45 can also be disposed in the form of an underlying platform 47 to prevent radiation from scattering downward although the shuttle itself 27 can be provided with shielding to cover the opening between the shuttle tracks to prevent radiation from reaching the truck drivers and dockside worker personnel through the opening.

The presently available scanning apparatus 39 can include x-ray machines, gamma ray detectors, and eventually neutron analysis machines. These latter devices may not require the capability of moving the container to scan it. Positioning a container at one place in relation to the scanning apparatus by stopping the shuttle movement may be sufficient or necessary. This might permit the container to be deposited on the landing deck at a buffer position while the scanning apparatus performs its function. In each case, radiation emission from the scanning apparatus either interrogates the containers or is detected by the scanning apparatus. So the term scanning apparatus includes all forms of radiation emissions generation and detection equipment which can be used in the present invention for the purpose of detecting nuclear weapons or fissionable material.

When new and improved non-intrusive scanning equipment evolves, it can be substituted for the radiation emission generation or detection equipment, possibly with the deletion of the unnecessary radiation protective apparatus, and mounted on the structure. Modifications to the present detection apparatus are envisioned as coming within the concept and apparatus of the present invention as claimed.

The present invention also contemplates the method for non-intrusive cargo container scanning for nuclear weapon material during combined quay crane and buffer crane operation. The steps comprise providing a crane structure mounted on tires formed for independent movement of the structure in a quay area. The structure is of a size whereby it can be located below or adjacent to a container handling ship-to-shore quay crane. The structure supports a shuttle on dual, parallel, elevated horizontal tracks for moving containers individually and lengthwise. The tracks extend between a first predetermined buffer container deposition position located at a first end of the structure, where a cargo container can be positioned for pickup or deposition by a quay crane, and a second predetermined position located at a second and other end of the structure. A fixed position bridge crane is mounted above the tracks at the second end of the structure and arranged for engaging and suspending or depositing and releasing a cargo container from or onto the shuttle at the second predetermined position. The bridge crane is also arranged for elevating and lowering a container between the tracks to and from the second predetermined position and a truck trailer chassis when one is disposed below the tracks at the second predetermined position at ground level when the shuttle has returned to the first predetermined position. A non-intrusive container scanning inspection apparatus is mounted on the structure between the first and second predetermined positions and formed to non-intrusively scan the length of a container passed before it. Radiation shielding integral to the platform 27 of the shuttle prevents radiation from penetrating below the shuttle into the work area of the crane underneath the structure.

When offloading a ship, a cargo container is deposited on the shuttle by the offloading quay crane when the shuttle is disposed at the first predetermined position. The shuttle moves the cargo container from the first predetermined position to the second predetermined position past the scanning apparatus while it is functioning to scan the container for nuclear weapons or fissionable material. A cargo container is then transported from the second predetermined position to a truck trailer truck chassis disposed below the second predetermined position when timely. This means when the truck trailer chassis is ready to receive it.

The process is repeated until the offloading of containers is completed. When loading a ship, the process is reversed and the scanning apparatus may or may not be operating.

The present invention provides a container scanning crane which can function as a buffer between two port operations, shipboard and dockside, and allows the other port operations to continue uninterrupted. Non-intrusive security scanning or screening occurs while a container is located in a buffer status whereby the port and quay crane operations continue to function without interruption. The scanning crane provides its own bridge crane for independent handling of the containers and apparatus for reciprocating them past the scanning apparatus. The buffer crane locates the scanning apparatus above the dockside truck operations so that it does not interfere with the flow of trucks on the wharf. The buffer scanning crane is an independent machine which can be installed in ports with minimum modifications to the facilities.

Thus, it will be apparent from the foregoing description of the invention in its preferred form that it will fulfill all the objects and advantages attributable thereto. While it is illustrated and described in considerable detail herein, the invention is not to be limited to such details as have been set forth except as may be necessitated by the appended claims.

We claim:

1. A method for nonintrusive cargo container scanning for nuclear weapon material during quay crane operations the steps comprising providing a crane structure mounted on tires and formed for independent movement of said structure on the wharf in a quay area and of a size whereby it can be located at variable positions below or adjacent to a container handling ship to shore quay crane, said structure supporting a shuttle on an elevated horizontal track for moving containers individually and lengthwise, said track extending between a first predetermined buffer container deposition position located at a first end of said structure where a cargo container can be positioned for pickup or deposition by a quay crane and a second predetermined position located at a second and other end of said structure, providing a fixed position bridge crane mounted above said track at said second end of said structure and arranged for engaging and suspending or depositing and releasing a cargo container from or onto said shuttle at said second predetermined position, said bridge crane also arranged for elevating and lowering a container between said second predetermined position and a truck trailer chassis when one is disposed below said second predetermined position at ground level and when said shuttle has returned to said first predetermined position, providing a container scanning inspection apparatus mounted on said structure between said first and second predetermined positions and formed to non-intrusively inspect the length of a container passed before it, providing radiation shielding integral to the platform of said shuttle preventing radiation from penetrating below said shuttle into the work area of said crane underneath said structure, and when offloading a ship, depositing a cargo container onto said shuttle by said off loading quay crane when said shuttle is disposed at said first predetermined position, moving said shuttle and said cargo container lengthwise from said first predetermined position to said second predetermined position past said scanning apparatus while it is functioning to scan said container for nuclear weapon material, transporting said cargo container from said second predetermined position to a trailer truck chassis disposed beneath said second predetermined position when timely;

repeating the process, and when loading a ship, reversing said process when said scanning apparatus is or is not operating.

* * * * *

UNITED STATES PATENT AND TRADEMARK OFFICE
CERTIFICATE OF CORRECTION

| | | |
|---|---|---|
| PATENT NO. | : 7,762,760 B2 | Page 1 of 1 |
| APPLICATION NO. | : 10/877920 | |
| DATED | : July 27, 2010 | |
| INVENTOR(S) | : Toru Takehara et al. | |

It is certified that error appears in the above-identified patent and that said Letters Patent is hereby corrected as shown below:

In column 2, line 20, "obvious, configurations" should read --obvious configurations--.
In column 2, line 37, "dock which" should read --dock, which--.
In column 3, line 29, "position" should read --positioned--.
In column 4, line 53, "is a" should be deleted between "is a" and "perspective."
In column 4, line 55, "is a" should be deleted between "Fig. 3" and "is an."
In column 4, line 56, "is a" should be deleted between "Fig. 4" and "is a."
In column 6, line 12, "waiting" should read --awaiting--.
In column 6, lines 59-67 and column 7, lines 1-9 should be deleted.
In column 8, line 47, "truck trailer truck" should read --truck--.

Signed and Sealed this
Twenty-fourth Day of May, 2011

David J. Kappos
*Director of the United States Patent and Trademark Office*